United States Patent
Hwang et al.

[11] Patent Number: 6,091,233
[45] Date of Patent: Jul. 18, 2000

[54] INTERLEAVED ZERO CURRENT SWITCHING IN A POWER FACTOR CORRECTION BOOST CONVERTER

[75] Inventors: Jeffrey Hwang, Saratoga; Thomas Li, Mountain View, both of Calif.

[73] Assignee: Micro Linear Corporation, San Jose, Calif.

[21] Appl. No.: 09/231,523

[22] Filed: Jan. 14, 1999

[51] Int. Cl.[7] .............................. G05F 1/656; H02M 7/04
[52] U.S. Cl. ............................................. 323/222; 363/89
[58] Field of Search .................... 323/222, 223, 323/225, 266, 282; 363/84, 89, 90, 125, 127

[56] References Cited

U.S. PATENT DOCUMENTS

| | | | |
|---|---|---|---|
| 3,294,981 | 12/1966 | Bose | 307/88.5 |
| 3,539,902 | 11/1970 | Hickling | 321/9 |
| 3,603,809 | 9/1971 | Uchiyama | 307/228 |
| 3,660,753 | 5/1972 | Judd et al. | 323/22 T |
| 3,742,330 | 6/1973 | Hodges et al. | 321/9 A |
| 3,832,643 | 8/1974 | Van Heyningen et al. | 330/15 |
| 3,883,756 | 5/1975 | Dragon | 307/265 |
| 4,035,710 | 7/1977 | Joyce | 363/37 |
| 4,293,904 | 10/1981 | Brooks et al. | 363/86 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,422,138 | 12/1983 | Kornrumpf | 363/21 |
| 4,437,146 | 3/1984 | Carpenter | 363/21 |
| 4,454,558 | 6/1984 | Huddart | 361/153 |
| 4,456,872 | 6/1984 | Froeschle | 323/286 |
| 4,529,927 | 7/1985 | O'Sullivan et al. | 323/222 |
| 4,628,438 | 12/1986 | Montague | 363/134 |
| 4,651,231 | 3/1987 | Douglas, Jr. | 358/342 |
| 4,661,896 | 4/1987 | Kobayashi et al. | 363/24 |
| 4,672,303 | 6/1987 | Newton | 323/285 |
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,685,043 | 8/1987 | Mehnert | 363/43 |

(List continued on next page.)

FOREIGN PATENT DOCUMENTS 60-22490  2/1985  Japan ............................................. 5/41

OTHER PUBLICATIONS

"ML 4824 Power Factor Correction and PWM Controller Combo," Micro Linear Corporation, May 1997.

"Load Share Controller, UC1902, UC2902, UC3902: Preliminary," Unitrode Integrated Circuits, Merrimack, NH, Oct. 1996.

(List continued on next page.)

*Primary Examiner*—Matthew Nguyen
*Attorney, Agent, or Firm*—Haverstock & Owens LLP

[57] ABSTRACT

A method and apparatus for interleaving switching of multiple transistor switches in a power factor correction (PFC) boost converter and for timing the switching to occur when a current through a freewheeling diode corresponding to each switch is at a minimum level. The converter draws input current from an alternating current power supply for forming a regulated output voltage. A controller senses an input current and an output voltage across an output capacitor for controlling switching to regulate the output voltage and to ensure that the input current is substantially in phase with an input voltage. Current through a first inductor associated with a first switch is allowed to fall substantially to zero upon discharging the first inductor prior to re-charging the first inductor. Charging of a second inductor associated with a second switch, however, is initiated prior to completion of discharging the first inductor. Similarly, current through the second inductor is allowed to fall substantially to zero prior to re-charging the second inductor. An advantage is that from the perspective of the power supply, the converter operates in continuous conduction mode, while from the perspective of each of the switches, the converter operates in discontinuous conduction mode. The invention reduces power dissipated in the switches, increasing reliability and allowing higher frequency operation. In accordance with another aspect of the invention, a synchronizing signal is generated by the PFC converter for synchronizing operation of a second converter, such as a pulse-width modulation converter, with the PFC converter.

48 Claims, 8 Drawing Sheets

U.S. PATENT DOCUMENTS

| Patent # | Date | Inventor | Class |
|---|---|---|---|
| 4,691,159 | 9/1987 | Ahrens et al. | 323/222 |
| 4,695,935 | 9/1987 | Oen et al. | 363/21 |
| 4,717,833 | 1/1988 | Small | 307/44 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,886,952 | 12/1989 | Horiuchi | 219/10.77 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,950,974 | 8/1990 | Pagano | 323/222 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,070,439 | 12/1991 | Remson | 363/22 |
| 5,132,606 | 7/1992 | Herbert | 323/266 |
| 5,138,249 | 8/1992 | Capel | 323/283 |
| 5,146,399 | 9/1992 | Gucyski | 363/89 |
| 5,157,269 | 10/1992 | Jordan et al. | 307/59 |
| 5,161,097 | 11/1992 | Ikeda | 363/124 |
| 5,272,613 | 12/1993 | Büthker | 363/21 |
| 5,278,490 | 1/1994 | Smedley | 323/284 |
| 5,287,261 | 2/1994 | Ehsani | 363/124 |
| 5,349,284 | 9/1994 | Whittle | 323/207 |
| 5,359,281 | 10/1994 | Barrow et al. | 323/284 |
| 5,397,976 | 3/1995 | Madden et al. | 323/222 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,436,550 | 7/1995 | Arakawa | 323/222 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,570,276 | 10/1996 | Cuk et al. | 363/16 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,663,874 | 9/1997 | Mader et al. | 363/21 |
| 5,691,592 | 11/1997 | Gunderson et al. | 310/317 |
| 5,691,889 | 11/1997 | Bazinet et al. | 363/89 |
| 5,747,977 | 5/1998 | Hwang | 323/284 |
| 5,771,164 | 6/1998 | Murai et al. | 363/89 |
| 5,847,548 | 12/1998 | He et al. | 323/222 |
| 5,861,734 | 1/1999 | Fasullo et al. | 323/222 |

OTHER PUBLICATIONS

"Nonlinear–Carrier Control for High Power Factor Rectifiers Based on Flyback, Cuk, or Sepic Converters," R. Zane and D. Maksimovic, Applied Power Electronics Conf., pp. 814–820, Mar. 1996.

"ML4880 Portable PC/PCMCIA Power Controller (Preliminary)," Micro Linear Corporation, Oct. 1995.

"ML4863 High Efficiency Flyback Controller," Micro Linear Corporation, Feb. 1995.

"ML4863EVAL User's Guide High Efficiency Flyback Controller," Micro Linear Corporation, Feb. 1995.

"Nonlinear–Carrier Control for High Power Factor Boost Rectifiers," D. Maksimovic, Y. Jang, R. Erikson, Applied Power Electronics Conf., pp. 635–641, Sep. 1995.

"ML4823 High Frequency Power Supply Controller," Micro Linear Corporation, Dec. 1994.

"Load Share Controller, UC1907, UC2907, UC3907," Unitrode Integrated Circuits, Merrimack, NH, Nov. 1994.

"Off–Line and One–Cell IC Converters Up Efficiency," Frank Goodenough, Electronic Design, pp. 55–56, 58, 60, 62–64, Jun. 27, 1994.

"ML4863 High Efficiency Battery Pack Converter (Preliminary)," Micro Linear Corporation, Jun. 1994.

"Designing with hysteretic current–mode control," Gedaly Levin and Kieran O'Malley, Cherry Semi–Conductor Corp., EDN, pp. 95–96, 98, 100–102, Apr. 28, 1994.

"Step–Up/Step Down Converters Power Small Portable Systems," Bruce D. Moore, EDN, pp. 79–84, Feb. 3, 1994.

"ML4861 Low Voltage Boost Regulator," Micro Linear Corporation, Jun. 1993.

"11. Variable Frequency Converters," K. Kit Sum, pp. 96–97, 134–135, May 1993.

"3.3V/5V/Adjustable Output, Step–Up, DC–DC Converters," Maxim Integrated Products, pp. 1–8, Aug. 1993.

"ML4821EVAL Average Current PFC Controller Evaluation Kit," Micro Linear Corporation, pp. 6–127, Jul. 1992.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis of the Free–Running Current–Mode–Controlled Converter," Richard Redl, pp. 897–906, IEEE, Aug. 1991.

INTERLEAVED ZERO CURRENT SWITCHING IN A POWER FACTOR CORRECTION BOOST CONVERTER

FIELD OF THE INVENTION

The present invention relates to the field of boost converters for electrical power supplies. More particularly, the present invention relates to a method and apparatus for interleaving switching of multiple transistor switches in a power factor correction boost converter and for timing the switching so as to occur when a current through a freewheeling diode is at a minimum level, preferably zero.

BACKGROUND OF THE INVENTION

Figure 1:
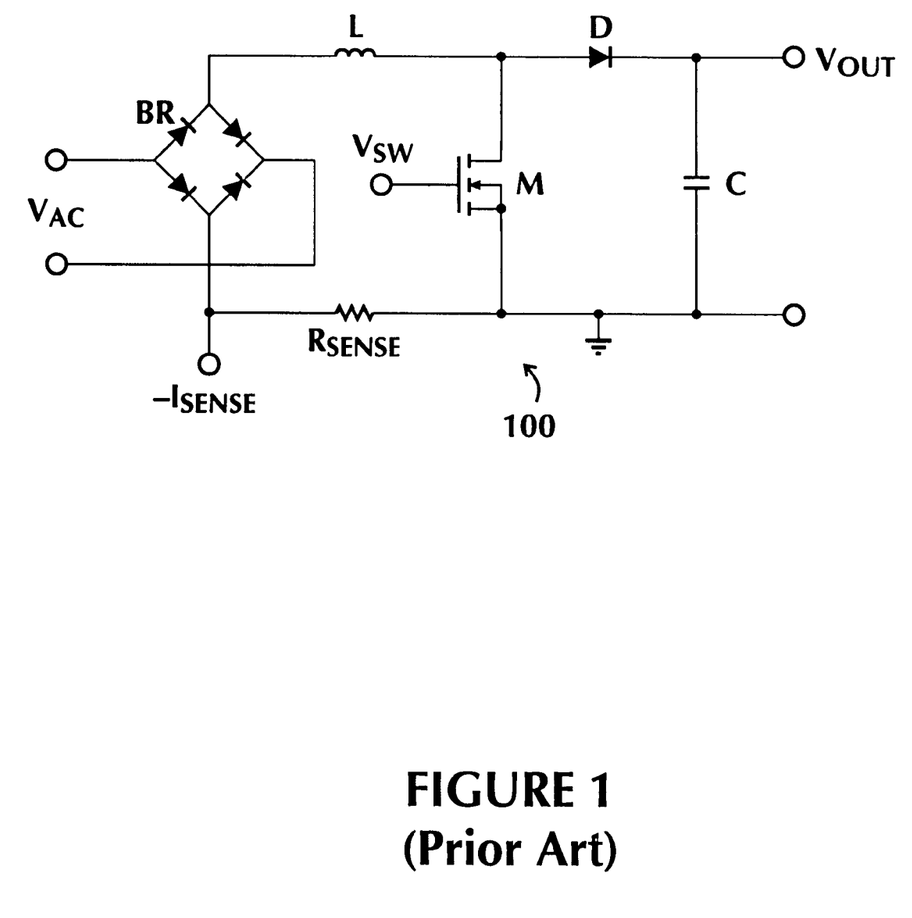
FIG. 1 illustrates a schematic diagram of a power factor correction (PFC) boost converter of the prior art.

FIG. 1 illustrates a schematic diagram of a prior art power factor correction (PFC) boost converter 100. An alternating-current (AC) voltage supply $V_{AC}$ is coupled across input terminals of a full-wave bridge rectifier BR. A first output terminal of the bridge rectifier BR is coupled to a first terminal of an inductor L. A second terminal of the inductor L is coupled to a drain of a transistor switch M and to an anode of a diode D. A cathode of the diode D is coupled to a first terminal of an output capacitor C. A second output terminal of the bridge rectifier BR is coupled to a first terminal of a sensing resistor $R_{SENSE}$. A second terminal of the sensing resistor $R_{SENSE}$, a source of the transistor switch M and a second terminal of the capacitor C are each coupled to a ground node. A voltage signal $-I_{SENSE}$ formed at the first terminal of the sensing resistor $R_{SENSE}$ is representative of current drawn by the boost converter 100 from the supply $V_{AC}$. The signal $-I_{SENSE}$ is negative in polarity because it is formed by a voltage drop across the resistor $R_{SENSE}$ referenced to ground. A switch control voltage signal $V_{SW}$ which is applied to the gate of the transistor switch M determines whether the transistor switch M is conductive (switch closed) or non-conductive (switch open).

When the switch M is closed, a current flows from the bridge rectifier BR through the inductor L and through the switch M. Under such conditions, the diode D is reverse-biased by the output voltage $V_{OUT}$. Current flowing through the inductor L stores energy as an electromagnetic field associated with the inductor L. When the switch M is opened, the stored energy is transferred to the output capacitor C by a current which flows through the diode D. Thus, under such conditions, the diode D is forward-biased. The energy stored in the output capacitor C form the output voltage $V_{OUT}$ across the capacitor C which is available for driving a load, such as a second power supply stage. A rate of energy transfer from the source $V_{AC}$ to the capacitor C depends upon a duty cycle of the switch control signal $V_{SW}$.

An object of the boost converter 100 illustrated in FIG. 1 is to control the times at which switching of the transistor switch M occurs such that the current drawn from the alternating-current supply $V_{AC}$ by the boost converter 100 is substantially in phase with the voltage provided by the supply $V_{AC}$ and to control the duty cycle of the transistor switch M such that the output voltage $V_{OUT}$ is maintained at a constant level. Accordingly, the voltage $V_{OUT}$ and the voltage $-I_{SENSE}$ are both monitored for controlling switching.

The diode D is often referred to as "freewheeling" because its bias conditions change depending upon the state of the transistor switch M. For example, when the transistor switch M is closed, the freewheeling diode D is under reverse-bias conditions, while upon opening of the transistor switch M, the freewheeling diode D is under forward-bias conditions.

When such a boost converter 100 is operated in continuous conduction mode (CCM), the current flowing through the inductor L remains above zero at all times. Thus, at the instant of closure of the switch M, current is flowing through the diode D. A parasitic capacitance associated with the diode D results in a finite recovery time for the diode D such that the diode D does not turn off instantaneously. Rather, a charge stored by the parasitic capacitance of the diode D is discharged through the switch M upon its closure. A resulting high level of current in the switch M can cause excessive power dissipation and premature failure of the switch M. Because this high level of current occurs each time the switch M is cycled, the switching frequency is limited. This is especially true for boost converters which drive a second power supply stage because such boost converters typically generate a regulated voltage of approximately 400 volts across the output capacitor C. Further, because an object of the PFC boost converter 100 is to control the times at which switching occurs such that the voltage and current provided by the supply $V_{AC}$ are in phase with each other, this problem of elevated current in the switch M cannot conventionally be avoided by allowing the current in the diode D to fall to zero prior to closing the switch M as would occur if the converter 100 were operated discontinuous conduction mode (DCM).

Therefore, what is needed is a PFC boost converter which minimizes a current level which flows through a main transistor switch upon closure of the switch.

SUMMARY OF THE INVENTION

A method and apparatus for interleaving switching of multiple transistor switches in a power factor correction boost converter and for timing the switching so as to occur when a current through a freewheeling diode corresponding to each switch is at a minimum level, preferably zero. The boost converter draws input current from an alternating current power supply for forming a regulated output voltage. An advantage of the present invention is that from the perspective of the power supply, the boost converter operates in continuous conduction mode (CCM) such that input current remains above zero throughout switching cycles. This allows the input current to be controlled such that is remains substantially in phase with an input voltage provided by the power supply. From the perspective of each of the transistor switches, however, the boost converter operates in discontinuous conduction mode (DCM) such that current through the freewheeling diode and inductor associated with each transistor switch falls to zero during each switching cycle. This reduces power dissipated in the transistor switches, increasing reliability of the transistor switches and allowing higher frequency operation of the boost converter.

More particularly, a power factor correction boost converter in accordance with the present invention includes a first inductor having a first terminal and a second terminal wherein the first terminal of the first inductor is coupled to receive energy from an alternating-current power supply, a first transistor having an input terminal, a output terminal and a control terminal, wherein the input terminal of the first transistor is coupled to a second terminal of the first inductor and the output terminal of the first transistor is coupled to a ground node, a first diode having an anode and a cathode, wherein the anode of the first diode is coupled to the input terminal of the first transistor, a second inductor having a first terminal and a second terminal, wherein a first terminal of the second inductor is coupled to receive energy from the alternating-current power supply, a second transistor having an input terminal, an output terminal and a control terminal, wherein the input terminal of the second transistor is coupled to a second terminal of the second inductor and the output terminal of the second transistor is coupled to a ground node, and an output capacitor having a first terminal and a second terminal wherein the first terminal of the output capacitor is coupled to the cathode of the first diode and to the cathode of the second diode.

A controller coupled to the control terminal of the first switch and to the control terminal of the second switch senses an input current provided by the alternating-current power supply and an output voltage formed across the capacitor for controlling switching of the first and second transistors so as to provide a regulated output voltage and to ensure that the input current is substantially in phase with an input voltage provided by the power supply. Current through the first inductor is preferably allowed to fall to zero (or to nearly zero) upon discharging the first inductor prior to initiating re-charging the first inductor. Charging of the second inductor, however, is preferably initiated prior to completion of discharging the first inductor. Similarly, current through the second inductor is preferably allowed to fall to zero (or to nearly zero) prior to initiating re-charging the second inductor. Charging of the first inductor is preferably initiated prior to completion of discharging the second inductor. In this manner, the switching of the transistor switches is interleaved such that the closing of each transistor switch occurs when a current through the corresponding freewheeling diode is at a minimum level.

In accordance with another aspect of the invention, a synchronizing signal is generated by a power factor correction (PFC) boost converter for synchronizing operation of a second converter, such as a pulse-width modulation (PWM) converter, with the PFC boost converter.

DETAILED DESCRIPTION OF A PREFERRED EMBODIMENT

Figure 2:
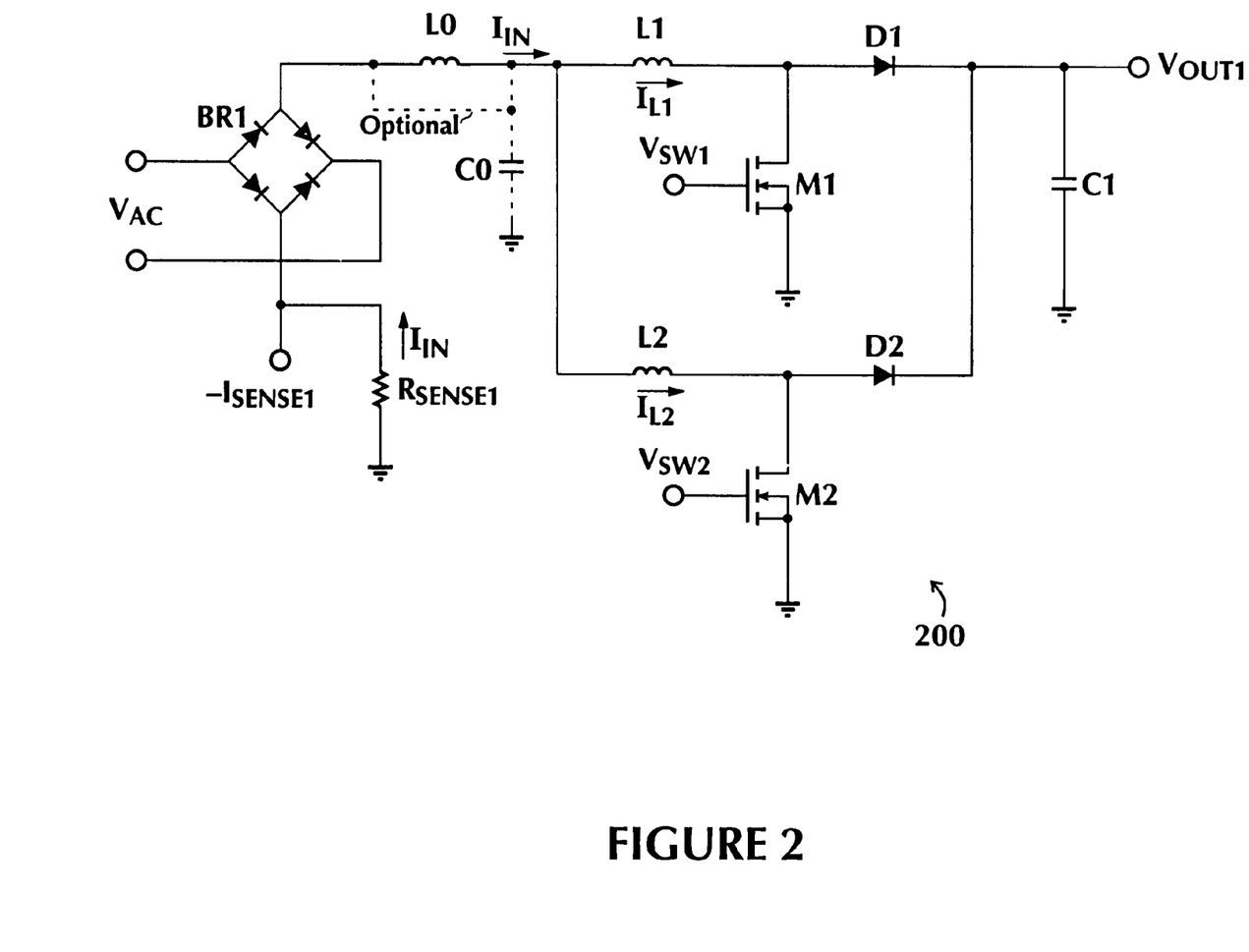
FIG. 2 illustrates a schematic diagram of a PFC boost converter in accordance with the present invention.

FIG. 2 illustrates a schematic diagram of a power factor correction (PFC) boost converter 200 in accordance with the present invention. An alternating-current (AC) voltage source $V_{AC}$ is coupled across input terminals of a full-wave bridge rectifier BR1. A first output terminal of the bridge rectifier BR1 is coupled to a first terminal of an inductor L0. A second terminal of the inductor L0 is coupled to a first terminal of an inductor L1 and to a first terminal of an inductor L2. A second terminal of the inductor L1 is coupled to a drain of a transistor switch M1 and to an anode of a diode D1. A second terminal of the inductor L2 is coupled to a drain of a transistor switch M2 and to an anode of a diode D2. A cathode of the diode D1 and a cathode of the diode D2 are each coupled to a first terminal of an output capacitor C1. A current $I_{IN}$ which flows through the inductor L0 is equal to a sum of currents $I_{L1}$ and $I_{L2}$ which flow through the inductors L1 and L2, respectively. An output voltage $V_{OUT1}$ is developed across the capacitor C1.

A second output terminal of the bridge rectifier BR is coupled to a first terminal of a sensing resistor $R_{SENSE1}$. A second terminal of the sensing resistor $R_{SENSE1}$, a source of the transistor switch M1, a source of the transistor switch M2 and a second terminal of the output capacitor C1 are each coupled to a ground node. A voltage signal $-I_{SENSE1}$ formed at the first terminal of the sensing resistor $R_{SENSE1}$ is representative of the current $I_{IN}$ supplied to the boost converter 200 from the supply $V_{AC}$. A switch control signal $V_{SW1}$ applied to the gate of the transistor switch M1 determines whether the transistor switch M1 is conductive (switch closed) or non-conductive (switch open). In addition, a switch control signal $V_{SW2}$ applied to the gate of the transistor switch M2 determines whether the transistor switch M2 is conductive (switch closed) or non-conductive (switch open).

Optionally, the inductor L0 is omitted from the PFC boost converter 200 and, instead, the inductor L0 is replaced by a short circuit. In which case, a first terminal of capacitor C0 is preferably coupled to the first terminal of the inductor L1 and to the first terminal of the inductor L2. A second terminal of the capacitor C0 is coupled to the ground node.

When the switch M1 is closed, the diode D1 is reverse-biased by the output voltage $V_{OUT1}$ and the current $I_{L1}$ flows through the switch M1. The current $I_{L1}$ flowing through the inductor L1 stores energy as an electromagnetic field associated with the inductor L1. When the switch M1 is opened, the stored energy is transferred to the output capacitor C1 by a current which flows through the diode D1. Thus, under such conditions, the diode D1 is forward-biased. Similarly, when the switch M2 is closed, the diode D2 is reverse-biased by the output voltage $V_{OUT1}$ and the current $I_{L2}$ flows through the switch M2. The current $I_{L2}$ flowing the inductor L2 stores energy as an electromagnetic field associated with the inductor L2. When the switch M2 is opened, the stored energy is transferred to the capacitor C1 by a current which flows through the diode D2. Thus, under such conditions, the diode D2 is forward-biased.

The energy stored in the output capacitor C1 forms the voltage $V_{OUT1}$ across the capacitor C1 which is available for driving a load, such as a second power supply stage. The rate of energy transfer from the source $V_{AC}$ to the capacitor C1 depends upon a duty cycle of the switch control signals $V_{SW1}$ and $V_{SW2}$.

Figure 3:
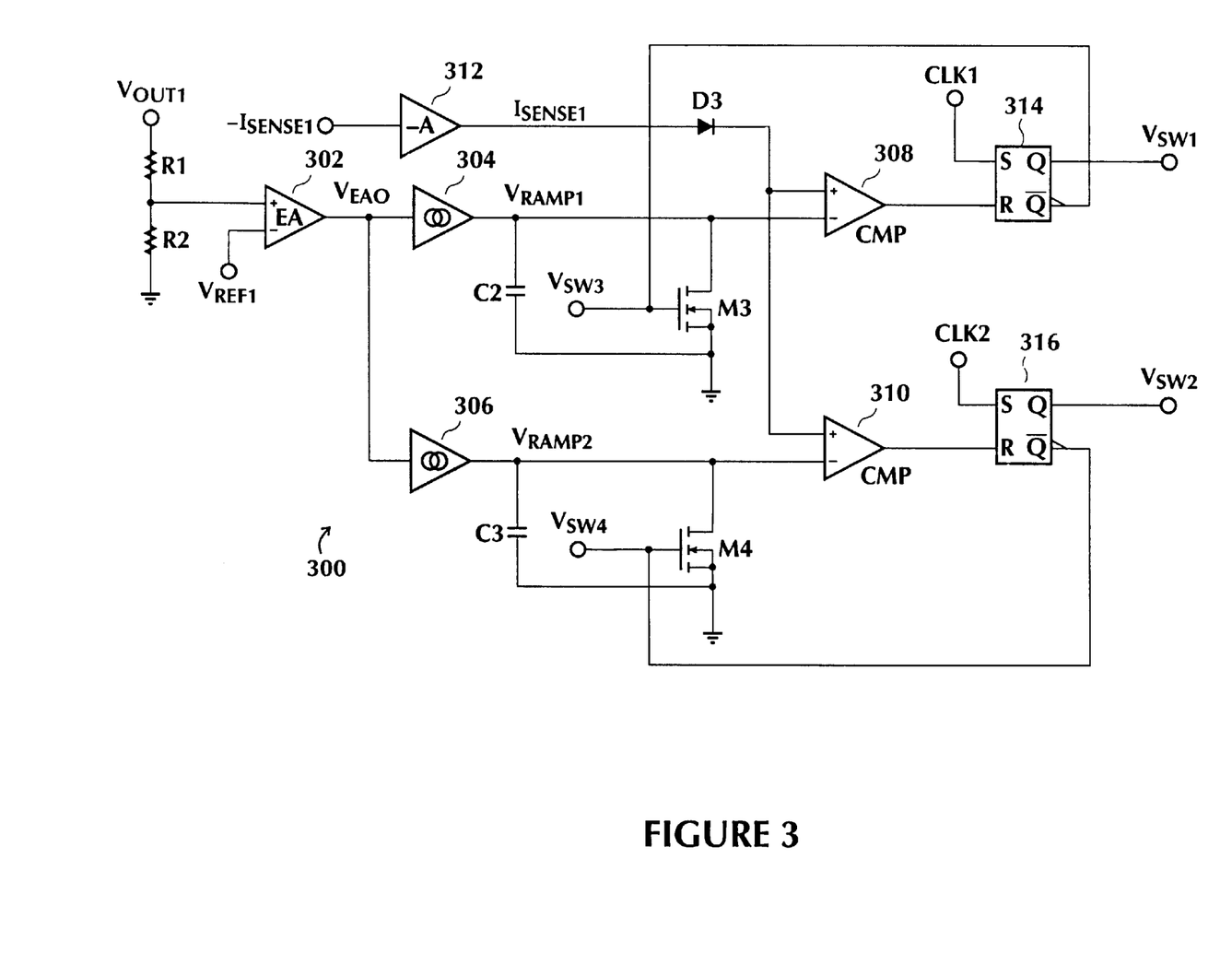
FIG. 3 illustrates a block schematic diagram of a controller circuit for controlling switching in the boost converter illustrated in FIG. 2 in accordance with the present invention.

FIG. 3 illustrates a block schematic diagram of a controller circuit 300 for controlling switching in the boost converter 200 illustrated in FIG. 2 in accordance with the present invention. More particularly, the controller circuit 300 forms the switch control signals $V_{SW1}$ and $V_{SW2}$ for controlling the switches M1 and M2 of FIG. 2. The voltage $V_{OUT1}$ is coupled to a first terminal of a resistor R1. A second terminal of the resistor R1 is coupled to a non-inverting input terminal of an error amplifier 302 and to a first terminal of a resistor R2. A second terminal of the resistor R2 is coupled to the ground node. The resistors R1 and R2 form a resistive divider for forming a voltage signal at the non-inverting input of the error amplifier 302 that is representative of the output voltage $V_{OUT1}$. In an alternate arrangement, an optical couple electrically isolates the error amplifier 302 from the boost converter 200 (FIG. 2).

A reference voltage $V_{REF1}$, which is representative of a desired level for the output voltage $V_{OUT1}$, is coupled to an inverting input of the error amplifier 302. An output of the error amplifier 302 forms an error signal $V_{EAO}$ and is coupled to an input of a voltage-to-current converter 304 and to an input of a voltage-to-current converter 306. An output of the voltage-to-current converter 304 is coupled to a first terminal of a capacitor C2, to a drain of a transistor M3 and to an inverting input of a comparator 308. A voltage signal $V_{RAMP1}$ is formed across the capacitor C2. An output of the voltage-to-current converter 306 is coupled to a first terminal of a capacitor C3, to a drain of a transistor M4 and to an inverting input of a comparator 310. A voltage signal $V_{RAMP2}$ is formed across the capacitor C3.

The current sensing signal -$I_{SENSE1}$ is coupled to an inverting input of an amplifier 312. An output of the amplifier 312 forms a signal $I_{SENSE1}$ and is coupled to an anode of a diode D3. A cathode of the diode D3 is coupled to a non-inverting input of the comparator 308 and to an non-inverting input of the comparator 310. The signal -$I_{SENSE1}$ is negative in polarity because it is formed by drawing the current $I_{IN}$ (FIG. 2) through the resistor $R_{SENSE1}$ from the ground node. Thus, the signal $I_{SENSE1}$ is positive in polarity. A second terminal of the capacitor C2, a second terminal of the capacitor C3, a source of the transistor M3 and a source of the transistor M4 are coupled to the ground node.

An output of the comparator 308 is coupled to a reset input R of a leading-edge-triggered flip-flop 314. A set input S of the flip-flop 314 is coupled to receive a clock signal CLK1. An output Q of the flip-flop 314 forms the switch control signal $V_{SW1}$. An inverted output $\overline{Q}$ of the flip-flop 314 is coupled to a gate of the transistor M3. An output of the comparator 310 is coupled a reset input R of a leading-edge-triggered flip-flop 316. A set input of the flip-flop 316 is coupled to receive a clock signal CLK2. An output Q of the flip-flop 316 forms the switch control signal $V_{SW2}$. An inverted output $\overline{Q}$ of the flip-flop 316 is coupled to a gate of the transistor M4.

Figures 4A, 4B:
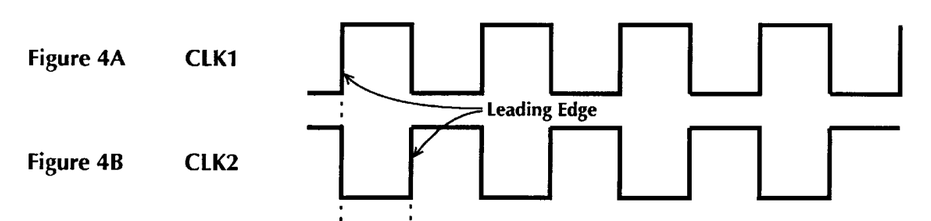
FIG. 4 illustrates a timing diagram for signals of the boost converter circuit illustrated in FIG. 2 and for signals of the controller circuit illustrated in FIG. 3.
Figures 4C, 4D:
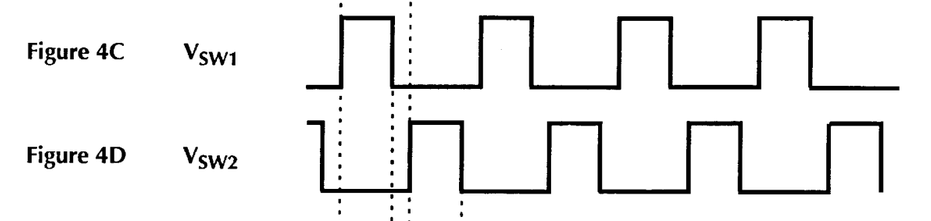
Figures 4E, 4F, 4G, 4H:
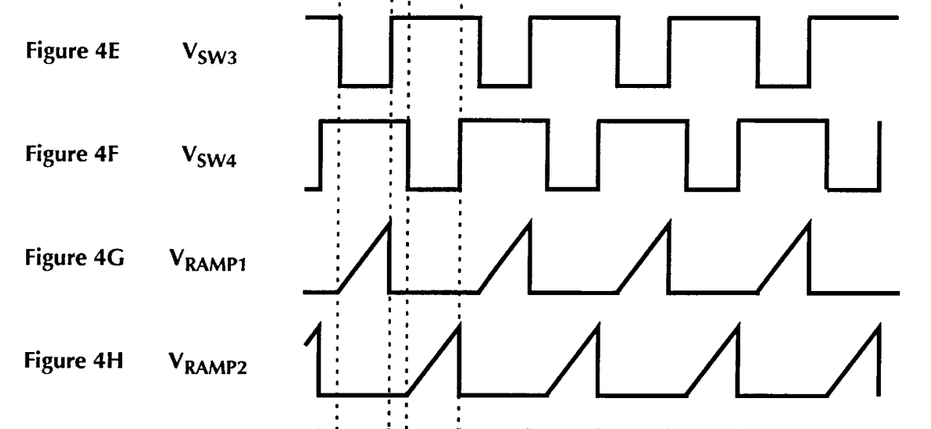
Figures 4I, 4J, 4K:
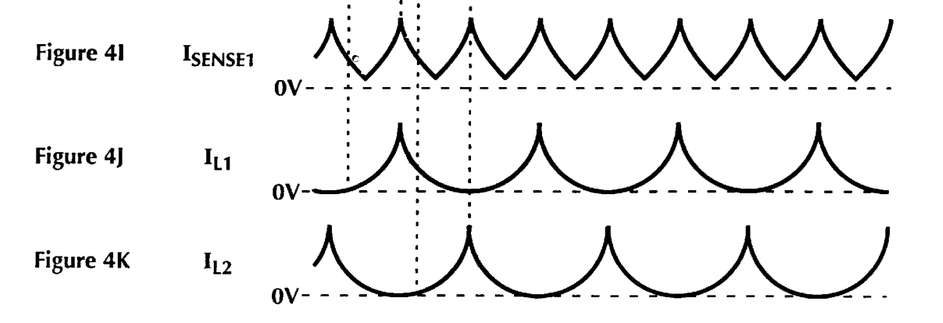

FIGS. 4A–K illustrate timing diagrams for selected signals of the boost converter 200 illustrated in FIG. 2 and for selected signals of the controller circuit 300 illustrated in FIG. 3. As illustrated by FIGS. 4A and 4B, the clock signals CLK1 and CLK2 preferably differ in phase by 180 degrees. Referring to FIGS. 2–4, upon a leading edge of the clock signal CLK1, the flip-flop 314 (FIG. 3) is placed in a "set" condition. Thus, the signal $V_{SW1}$ is a logic high voltage, as shown by FIG. 4C, which closes the switch M1 (FIG. 2). In addition, the signal $V_{SW3}$ is a logic low voltage, as shown by FIG. 4E, which opens the switch M3 (FIG. 3). Because the switch M3 is open, the ramp signal $V_{RAMP1}$ begins ramping up, as shown by FIG. 4G where the signal $V_{RAMP1}$ begins rising upon the occurrence of a leading edge in the signal CLK1. A rate at which the ramp signal $V_{RAMP1}$ rises is dependent upon a level of the error signal $V_{EAO}$. Further, because the switch M1 is closed, the current $I_{IN}$ from the supply $V_{AC}$ begins to ramp up, thereby storing energy as an electromagnetic field associated with the inductor L1 (FIG. 2). This is shown by FIG. 4J where the current $I_{L1}$ begins to rise upon the leading edge of the clock signal CLK1. In addition, the signal $I_{SENSE1}$ begins to rise upon the leading edge of the clock signal CLK1, as shown by FIG. 4I. Under these conditions, the output of the comparator 308 (FIG. 3) is a logic low voltage. This is due, in part, because of the presence of the diode D3 which provides an offset of approximately 0.7 volts to the signal $I_{SENSE1}$ before it is applied to the comparator 308.

When the signal $I_{SENSE1}$ exceeds the level of the signal $V_{RAMP1}$ by one diode voltage drop, however, the output of the comparator 308 changes state from a logic low voltage to a logic high voltage. This places the flip-flop 314 in a reset condition. As a result, the signal $V_{SW1}$ transitions to a logic low voltage, as shown by FIG. 4C, which opens the switch M1 (FIG. 2). In addition, the signal $V_{SW3}$ transitions to a logic high voltage, as shown by FIG. 4E, which closes the switch M3 (FIG. 3). Because the switch M1 is open, the energy stored as an electromagnetic field associated with the inductor L1 (FIG. 2) is discharged into the output capacitor C1 through the diode D1, thereby boosting the output voltage $V_{OUT1}$. Because the switch M3 (FIG. 3) is closed, the ramp signal $V_{RAMP1}$ is discharged to ground, as shown in FIG. 4G. The ramp signal $V_{RAMP1}$ remains at ground level until a next leading edge of the clock signal CLK1.

Upon a leading edge of the clock signal CLK2, the flip-flop 316 (FIG. 3) is placed in a "set" condition. Thus, the signal $V_{SW2}$ is a logic high voltage, as shown by FIG. 4D, which closes the switch M2 (FIG. 2). In addition, the signal $V_{SW4}$ is a logic low voltage, as shown by FIG. 4F, which opens the switch M4 (FIG. 3). Because the switch M4 is open, the ramp signal $V_{RAMP2}$ begins ramping up, as shown by FIG. 4H where the signal $V_{RAMP2}$ begins rising upon the occurrence of a leading edge in the signal CLK2. A rate at which the ramp signal $V_{RAMP2}$ rises is dependent upon a level of the error signal $V_{EAO}$. Further, because the switch M2 is closed, the current $I_{IN}$ from the supply $V_{AC}$ begins to ramp up, thereby storing energy as an electromagnetic field associated with the inductor L2 (FIG. 2). This is shown by FIG. 4K where the current $I_{L2}$ begins to rise upon the leading edge of the clock signal CLK2. In addition, the signal $I_{SENSE1}$ begins to rise upon the leading edge of the clock signal CLK2, as shown by FIG. 4I. Under these conditions, the output of the comparator 308 (FIG. 3) is a logic low voltage.

When the signal $I_{SENSE1}$ exceeds the level of the signal $V_{RAMP2}$ by one diode voltage drop, however, the output of the comparator 310 changes state from a logic low voltage to a logic high voltage. This places the flip-flop 316 in a reset condition. As a result, the signal $V_{SW2}$ transitions to a logic low voltage, as shown in FIG. 4G, which opens the switch M2 (FIG. 2). In addition, the signal $V_{SW4}$ transitions to a logic high voltage, as shown in FIG. 4F, which closes the switch M4 (FIG. 3). Because the switch M2 is open, the energy stored as an electromagnetic field associated with the inductor L2 (FIG. 2) is discharged into the output capacitor C1 through the diode D2, thereby boosting the output voltage $V_{OUT1}$. Because the switch M4 (FIG. 3) is closed, a the ramp signal $V_{RAMP2}$ is discharged to ground, as shown in FIG. 4H. The ramp signal $V_{RAMP2}$ remains at ground level until a next leading edge of the clock signal CLK2.

The input current $I_{IN}$ provided to the boost converter 200 (FIG. 2) can remain above zero throughout an entire switching cycle during which the switches M1 and M2 are each opened and closed. This is shown by FIG. 4I where the current sensing signal $I_{SENSE1}$ remains above zero at all times. Thus, from the perspective of the supply $V_{AC}$, the boost converter 200 operates in continuous conduction mode (CCM). This feature of the present invention allows the current $I_{IN}$ to be maintained substantially in phase with the AC voltage signal provided by the supply $V_{AC}$.

The current $I_{L1}$, however, can fall to zero during each switching cycle prior to closure of the switch M1 (FIG. 2). This is shown in FIG. 4J where the current signal $I_{L1}$ falls to zero after the electromagnetic energy stored in association with the inductor L1 is discharged into the output capacitor C1. The diode D1 becomes reverse biased as the current $I_{L1}$ falls. Accordingly, the diode D1 is already under reverse-bias conditions when the switch M1 is opened. Similarly, the current $I_{L2}$ can fall to zero during each switching cycle prior to closure of the switch M2 (FIG. 2). This is shown in FIG. 4K where the current signal $I_{L2}$ falls to zero after the electromagnetic energy stored in association with the inductor L2 is discharged into the output capacitor C1. Similarly to the diode D1, the diode D2 becomes reverse biased as the current $I_{L2}$ falls. Accordingly, the diode D2 is already under reverse-bias conditions when the switch M2 is opened.

Thus, from the perspective of the diodes D1, D2 and the switches M1, M2 the boost converter 200 operates in discontinuous conduction mode (DCM). This feature of the present invention prevents a high level of current from flowing through either of the switches M1 and M2 upon their respective closure. Accordingly, power dissipation in the switches M1 and M2 is reduced in comparison to power dissipated in a single transistor switch employed in accordance with conventional CCM techniques.

Though the current $I_{L1}$ and $I_{L2}$ preferably fall to zero during each switching cycle, it will be apparent that this is not strictly necessarily to achieve the principle advantages of the present invention. For example, assume that the current $I_{L1}$ or $I_{L2}$ is allowed to fall to a low level, but which is above zero, during discharging of the corresponding inductor L1 or L2. Then, the energy stored by the parasitic capacitance of the corresponding diode D1 or D2 is reduced when the corresponding switch M1 or M2 is closed in comparison to the energy stored by the diode D in the prior art arrangement of FIG. 1. Further, if the currents $I_{L1}$ or $I_{L2}$ are allowed to fall to zero, or to nearly zero, prior to closing the corresponding switch M1 or M2 on at least a portion of the switching cycles, then the average level of energy required to be dissipated in the switch M1 or M2 will be reduced in comparison to the prior arrangement of FIG. 1.

From FIGS. 2–4 and the discussion above, it will be apparent that a feature of the invention is that only a signal sensing resistor $R_{SENSE1}$ need be included in the PFC boost converter 200 and that only a single corresponding sensing signal $-I_{SENSE1}$ need be provided to the controller 300 though the switching of multiple transistors M1 and M2 is controlled. This aspect of the present invention minimizes the pin count required for implementing the controller 300 as an integrated circuit.

A PFC boost converter having interleaved switching of multiple main transistor switches has been described. It will be apparent that one or more additional paths, each additional path including an additional main transistor switch for transferring energy from the supply $V_{AC}$ to the output $V_{OUT1}$, can be added with appropriate modifications. For example, another inductor can be added having a first terminal coupled to the second terminal of the inductor L0 (FIG. 2) and a second terminal coupled to drain of a third transistor switch and to an anode of a diode where a cathode of the diode is coupled to the first terminal of the output capacitor C1 and a source of the third transistor switch is coupled to the ground node. For such embodiment, three clock signals, each 120 degrees apart in phase, are required in addition to appropriate modifications to the controller circuit illustrated in FIG. 3 for appropriately controlling all three main transistor switches.

According to an embodiment of the present invention, the inductors L0, L1 and L2 illustrated in FIG. 3 are discrete elements. In an alternate embodiment, the two or more of the inductors L0, L1 and L2 are wound about same inductor core so as to conserve printed circuit board space.

Further, in alternate embodiments of the present invention, the switches M1 and M2 (FIG. 2) can be controlled such that, at any one time, the inductors L1 and L2 (FIG. 2) are both charging or both discharging. Similarly, at any one time, one of the inductors L1 or L2 can be charging while the other is discharging.

Figure 5A:
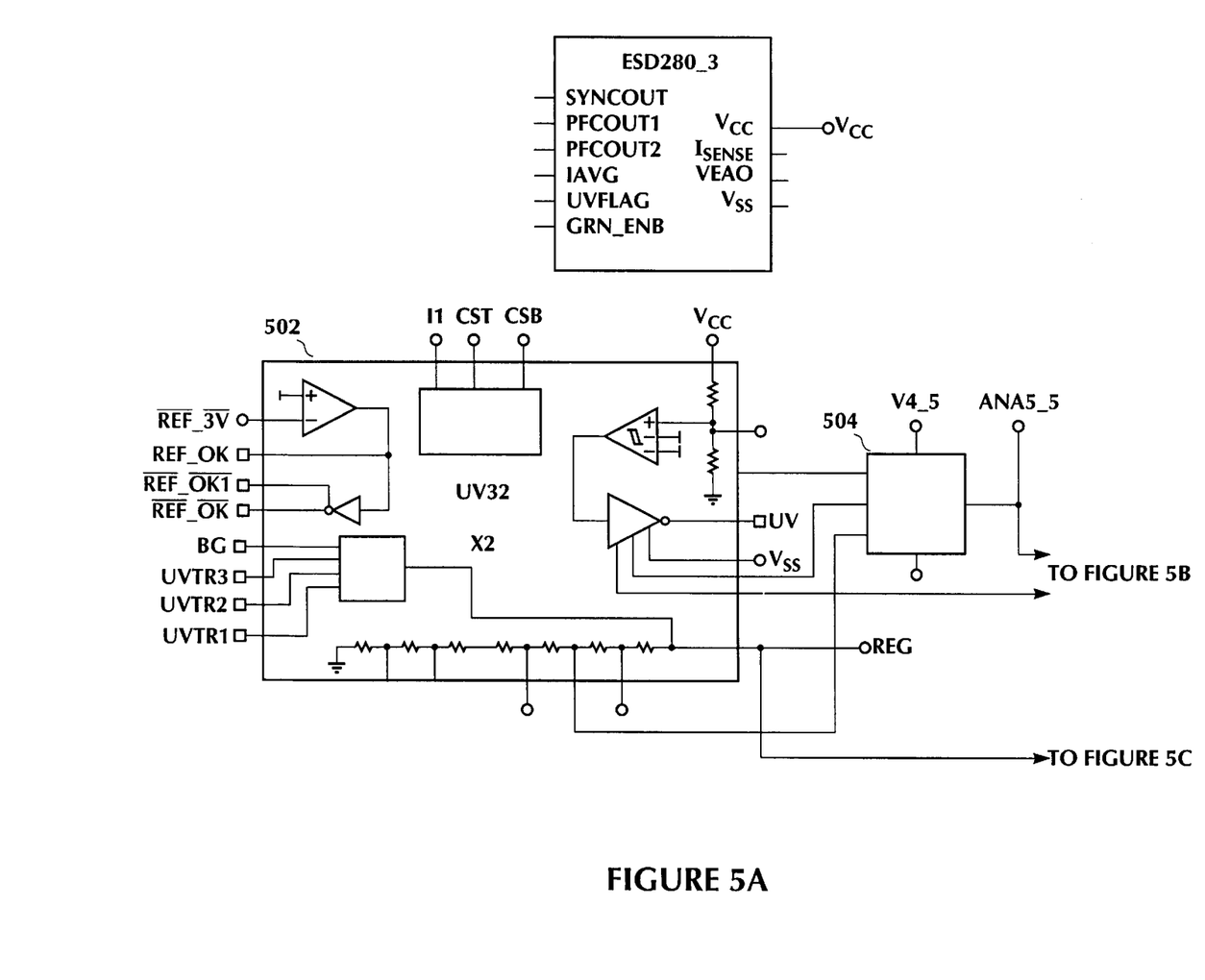
FIGS. 5A–B illustrate a detailed schematic diagram of an integrated circuit controller in accordance with the present invention.
Figure 5B:
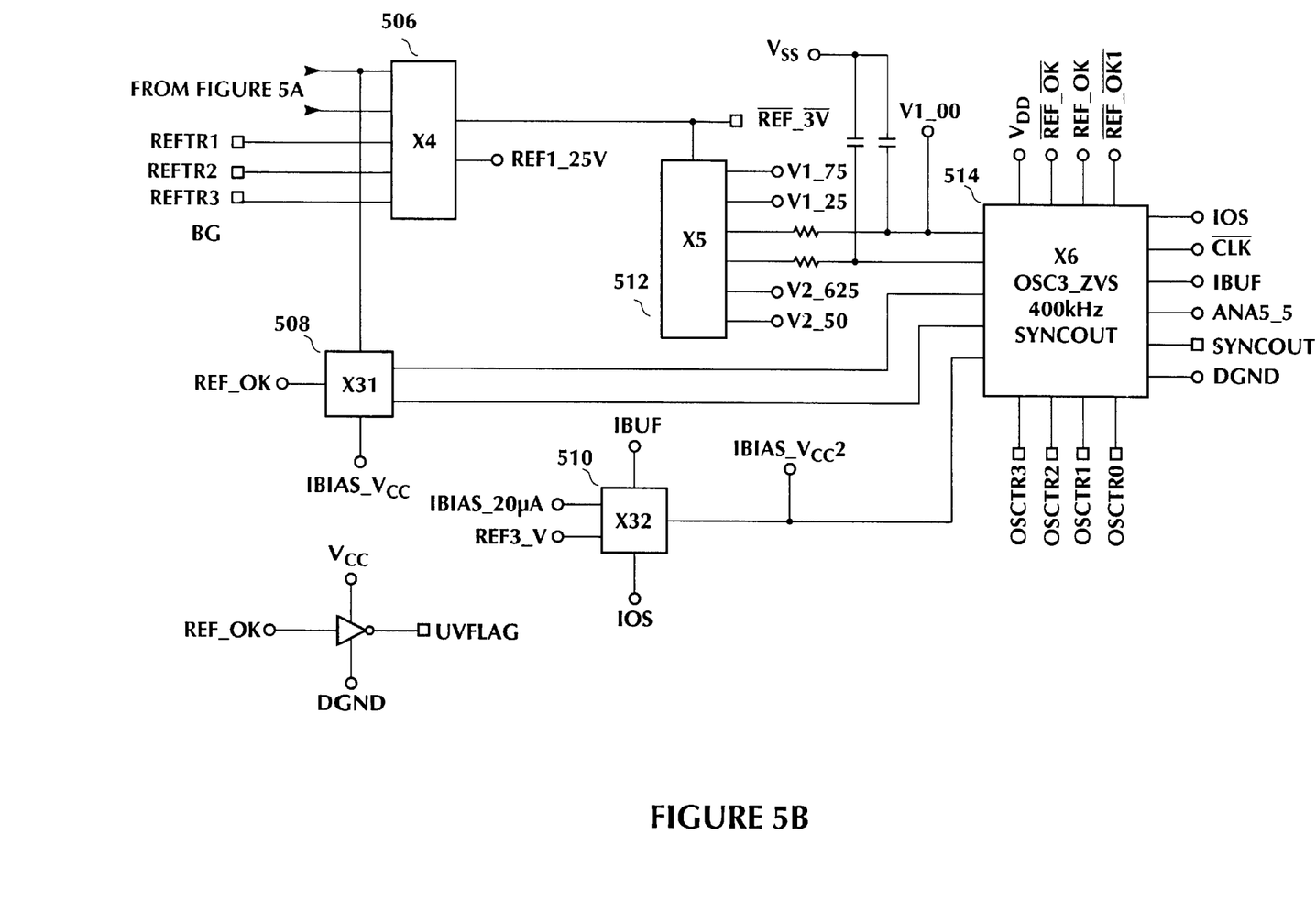
Figure 5C:
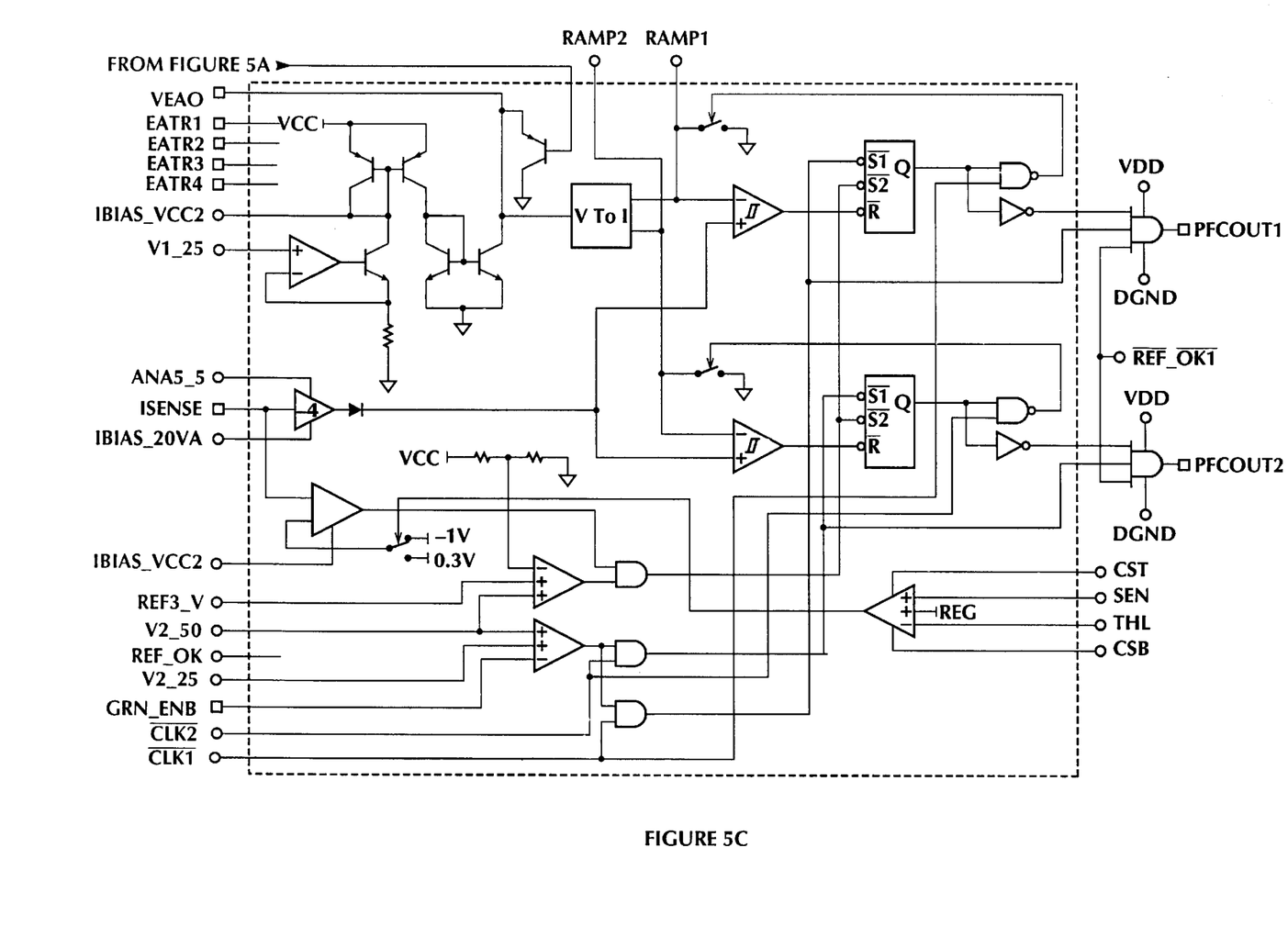

FIGS. 5A–B illustrate a detailed schematic diagram of an integrated circuit in accordance with the present invention. It is anticipated that the integrated circuit illustrated in FIG. 5 will be available from Micro Linear Corporation, 2092 Concourse Drive, San Jose, Calif. The integrated circuit illustrated in FIG. 5 includes a PFC controller circuit 500, an under-voltage lock-out block 502, reference voltage blocks 504, 506, biasing blocks 508, 510, a resistive network 512 and a sync out block 514.

The PFC controller circuit 500 can be coupled to the PFC boost converter 200 illustrated in FIG. 2 by coupling the PFCOUT1 and PFCOUT2 terminals illustrated in FIG. 5 to the gate terminals of the transistor switches M1 and M2, respectively, illustrated in FIG. 2. According to the implementation of the present invention illustrated in FIG. 5, the PFC function of ensuring that the input current $I_{IN}$ is substantially in phase with the input supply voltage $V_{AC}$ is performed by PFC controller circuit 500 in accordance with input current shaping techniques. Such a technique is described in detail for a PFC boost converter having a single main transistor switch in U.S. Pat. No. 5,742,151, issued Apr. 21, 1998 and entitled, "INPUT CURRENT SHAPING TECHNIQUE AND LOW PIN COUNT FOR A PFC-PWM BOOST CONVERTER," the contents of which are hereby incorporated by reference. It will be apparent that such a technique can be applied to the PFC controller circuit 500 for controlling two or more main transistor switches in accordance with the present invention. In addition, it will be apparent that other techniques for ensuring that the input current $I_{IN}$ is substantially in phase with the input supply voltage $V_{AC}$ can be implemented while achieving the principal objects and advantages of the present invention.

In the preferred embodiment, the PFC controller circuit 500 implements a "one pin" error amplifier as described in detail in U.S. patent application Ser. No. 08/796,128, filed Feb. 6, 1997, and entitled, "ONE PIN ERROR AMPLIFIER AND SWITCHED SOFT-START FOR AN EIGHT PIN PFC-PWM COMBINATION INTEGRATED CIRCUIT CONTROLLER," the contents of which are hereby incorporated by reference.

In the preferred embodiment, the regulated output voltage $V_{OUT1}$ developed across the capacitor C1 is approximately 380–400 volts. A second converter stage can be coupled to the output capacitor C1 (FIG. 2) for converting the output voltage $V_{OUT1}$ into one or more regulated voltage levels lower than the voltage $V_{OUT1}$, such as 3.5 volts and/or 12 volts. In the preferred embodiment, the second converter stage performs this conversion in accordance with pulse-width modulation (PWM) techniques.

Figure 4L:
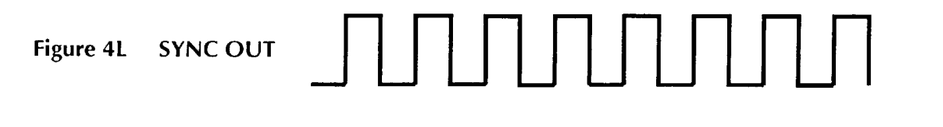
Figure 6:
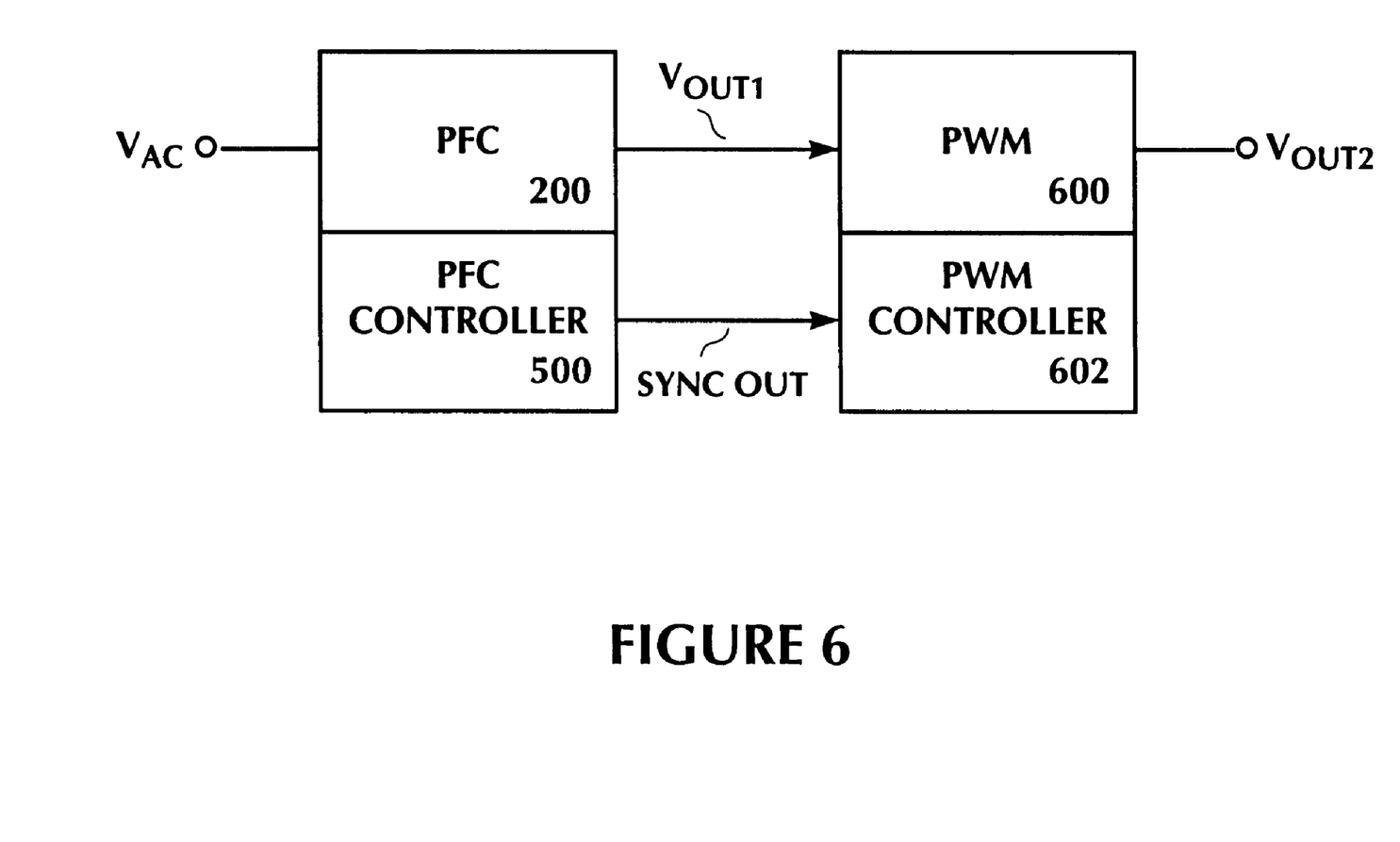
FIG. 6 illustrates a PFC boost converter coupled to provide the SYNC OUT signal to a PWM converter in accordance with the present invention.

Also in the preferred embodiment, a synchronizing signal SYNC OUT is generated by the sync out block 514 in accordance with the present invention for synchronizing operation of a PWM stage with the PFC boost converter. FIG. 6 illustrates the PFC boost converter 200 and the controller 500 coupled to provide the SYNC OUT signal to a PWM converter 600 and associated controller 602 in accordance with the present invention. The SYNC OUT signal is illustrated in FIG. 4L. As shown in FIG. 4L, a leading edge appears in the SYNC OUT signal for each leading edge which appears in the clock signals CLK1 and CLK2. Accordingly, for a PFC stage having two main transistor switches, such as the PFC boost converter 200 (FIG. 2), the SYNC OUT signal is preferably twice the frequency of either of the clock signals CLK1 or CLK2.

Further, in the preferred embodiment, the present invention is operable in one or more low power modes wherein switching of the main transistor switches M1, M2 is temporarily disabled during periods of low power consumption by a load, as described in U.S. patent application Ser. No. 08/916,570, filed Aug. 22, 1997, and entitled, "TWO-STAGE SWITCHING REGULATOR HAVING LOW POWER MODES RESPONSIVE TO LOAD POWER CONSUMPTION," the contents of which are hereby incorporated by reference.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, current levels, and voltage levels disclosed herein.

What is claimed is:

1. A controller for a power factor correction boost converter comprising:
    a. first means for controlling charging of a first inductor with energy from an alternating-current power supply and for controlling discharging of the first inductor into an output capacitor wherein the first means operates in accordance with a first clock signal;
    b. second means for controlling charging of a second inductor with energy from the power supply and for controlling discharging of the second inductor into the output capacitor wherein the second means operates in accordance with a second clock signal and wherein the second means is coupled to the first means; and
    c. means for forming a synchronizing output signal for synchronizing operation of a pulse width modulation converter with the power factor correction boost converter wherein the synchronizing output signal is synchronous with at least one of the first clock signal and the second clock signal.

2. The controller according to claim 1 wherein a current provided by the power supply is maintained substantially in phase with a voltage provided by the power supply.

3. The controller according to claim 1 wherein the first means is also for re-charging the first inductor and wherein a current through the first inductor falls to zero during discharging the first inductor before the first means initiates re-charging the first inductor.

4. The controller according to claim 1 wherein the first inductor and the second inductor are wound about a same inductor core.

5. The controller according to claim 1 wherein the first clock signal and the second clock signal differ in phase by approximately 180 degrees.

6. The controller according to claim 1 wherein the second means initiates charging of the second inductor while the first means is discharging the first inductor.

7. The controller in accordance with claim 1 wherein the first means compares a signal representative a voltage across the output capacitor to a signal representative of a current drawn by the power factor correction boost converter for controlling timing for charging and discharging the first inductor.

8. The controller in accordance with claim 7 wherein the current drawn by the power factor correction boost converter is sensed as a voltage across a sensing resistor.

9. The controller in accordance with claim 8 wherein a voltage dropping diode is arranged to adjust a level of voltage sensed across the sensing resistor.

10. A power factor correction boost converter comprising:
    a. a first energy storage element for receiving energy from an alternating-current power supply;
    b. a first switch coupled to the first energy storage element wherein the first switch is selectively conditioned open or closed and wherein when the first switch is closed, energy is transferred from the power supply to the first energy storage element;
    c. a second energy storage element for receiving energy from the power supply; p1 d. a second switch coupled to the second energy storage element wherein the second switch is selectively conditioned open or closed and wherein when the second switch is closed, energy is transferred from the power supply to the second energy storage element; and
    e. a third energy storage element coupled to the first switch and to the second switch, wherein when the first switch is opened, energy is transferred from the first energy storage element to the third energy storage element and wherein when the second switch is open, energy is transferred from the second energy storage element to the third energy storage element; and
    f. a controller coupled to the first switch and to the second switch wherein the controller senses a current provided by the power supply for controlling switching.

11. The power factor correction boost converter according to claim 10 wherein the first energy storage element is a first inductor, the second energy storage element is a second inductor and the third energy storage element is a capacitor.

12. The controller in accordance with claim 11 wherein the current provided by the power supply is substantially equal to a sum of a first current which flows through the first energy storage element and a second current which flows through the second energy storage element.

13. The power factor correction boost converter according to claim 12 wherein the first current recurrently rises above zero and then falls substantially to zero.

14. The power factor correction boost converter according to claim 13 wherein the first switch is opened and closed recurrently and wherein the first current falls substantially to zero after the first switch is opened and before the first switch is closed.

15. The power factor correction boost converter according to claim 14 wherein the second current recurrently rises above zero and then falls substantially to zero.

16. The power factor correction boost converter according to claim 14 wherein the sum of the first current and the second current remains above zero throughout a complete cycle of opening and closing the first switch.

17. The power factor correction boost converter according to claim 16 wherein the second current recurrently falls substantially to zero.

18. The power factor correction boost converter according to claim 14 wherein the controller senses a voltage formed across the third energy storage element for controlling switching.

19. The power factor correction boost converter according to claim 14 wherein the second switch is opened and closed recurrently and wherein the second current falls substantially to zero after the second switch is opened and before the second switch is closed.

20. The power factor correction boost converter according to claim 19 wherein a sum of the first current and a sum of the second current remains above zero throughout a complete cycle of opening and closing each of the first and second switch.

21. The power factor correction boost converter according to claim 20 wherein switching operations for the first switch are interleaved with switching operations of the second switch.

22. The power factor correction boost converter according to claim 20 wherein the first switch is operated in accordance with a first clock signal and wherein the second switch is operated in accordance with a second clock signal and wherein the first clock signal and the second clock signal differ in phase by approximately 180 degrees.

23. The power factor correction boost converter according to claim 22 further comprising a means for forming a synchronizing output signal wherein the synchronizing output signal is synchronous with at least one of the first clock signal and the second clock signal.

24. The power factor correction boost converter according to claim 11 wherein the first inductor and the first switch together form a first energy transfer path between the power supply and the capacitor, and wherein the second inductor and the second switch together form a second energy transfer path between the power supply and the capacitor and further comprising one or more additional energy transfer paths between the power supply and the capacitor, each additional energy transfer path having a respective inductor and a respective switch.

25. The power factor correction boost converter according to claim 24 wherein a second current flows through the second inductor and wherein an additional current flows through each inductor of the one or more additional energy paths and wherein a sum of the first current, the second current and the additional current through each inductor remains above zero throughout a complete cycle of opening and closing the first switch.

26. A controller for a power factor correction boost converter comprising:
   a. first means for controlling charging of a first inductor with energy from an alternating-current power supply and for controlling discharging of the first inductor into an output capacitor; and
   b. second means for controlling charging of a second inductor with energy from the power supply and for controlling discharging of the second inductor into the output capacitor wherein the first means and the second means are responsive to a sensing signal representative of a level of current drawn by the power factor correction boost converter.

27. The controller in accordance with claim 26 wherein the current drawn by the power factor correction boost converter is maintained substantially in phase with a voltage provided by the power supply.

28. The controller in accordance with claim 26 wherein the first means is also for controlling re-charging of the first inductor and wherein a current through the first inductor falls to zero during discharging the first inductor before the first means initiates re-charging the first inductor.

29. The controller in accordance with claim 26 wherein the first inductor and the second inductor are wound about a same inductor core.

30. The controller in accordance with claim 26 wherein the first means operates in accordance with a first clock signal and the second means operates in accordance with a second clock signal wherein the first clock signal and the second clock signal differ in phase by approximately 180 degrees.

31. The controller in accordance with claim 26 wherein the second means initiates charging of the second inductor while the first means is discharging the first inductor.

32. The controller in accordance with claim 26 wherein the first means compares a signal representative a voltage across the output capacitor to a signal representative of a current drawn by the power factor correction boost converter for controlling timing for charging and discharging the first inductor.

33. The controller in accordance with claim 32 wherein the current drawn by the power factor correction boost converter is sensed as a voltage across a sensing resistor.

34. The controller in accordance with claim 33 wherein a voltage dropping diode is arranged to adjust a level of voltage sensed across the sensing resistor.

35. A controller for power factor correction boost converter comprising:
   a. first means for controlling charging of a first inductor with energy from an alternating-current power supply and for controlling discharging of the first inductor into an output capacitor wherein the first means is responsive to a first ramp signal and wherein a rate at which the first ramp signal rises is representative of a voltage across the capacitor; and
   b. second means for controlling charging of a second inductor with energy from the power supply and for controlling discharging of the second inductor into the output capacitor wherein the second means is responsive to a second ramp signal and wherein a rate at which the second ramp signal rises is representative of a voltage across the output capacitor.

36. The controller in accordance with claim 35 wherein the current drawn by the power factor correction boost converter is maintained substantially in phase with a voltage provided by the power supply.

37. The controller in accordance with claim 35 wherein the first means is also for controlling re-charging of the first inductor and wherein a current through the first inductor falls to zero during discharging the first inductor before the first means initiates re-charging the first inductor.

38. The controller in accordance with claim 35 wherein the first inductor and the second inductor are wound about a same inductor core.

39. The controller in accordance with claim 35 wherein the first means operates in accordance with a first clock signal and the second means operates in accordance with a second clock signal wherein the first clock signal and the second clock signal differ in phase by approximately 180 degrees.

40. The controller in accordance with claim 35 wherein the second means initiates charging of the second inductor while the first means is discharging the first inductor.

41. The controller in accordance with claim 35 wherein the first means compares a signal representative a voltage across the output capacitor to a signal representative of a current drawn by the power factor correction boost converter for controlling timing for charging and discharging the first inductor.

42. The controller in accordance with claim 41 wherein the current drawn by the power factor correction boost converter is sensed as a voltage across a sensing resistor.

43. The controller in accordance with claim 42 wherein a voltage dropping diode is arranged to adjust a level of voltage sensed across the sensing resistor.

44. A method of performing power factor correction in a boost converter, the method comprising steps of:
- a. charging a first inductor with energy from an alternating-current power supply;
- b. discharging the first inductor into an output capacitor;
- c. forming a first ramp signal wherein a rate at which the first ramp signal rises is representative of a voltage across the output capacitor;
- d. charging a second inductor with energy from the power supply wherein the step of charging the second inductor is initiated prior to completion of the step of discharging the first inductor;
- e. forming a second ramp signal wherein a rate at which the second ramp signal rises is representative of a voltage across the output capacitor; and
- f. discharging the second inductor into the output capacitor.

45. The method in accordance with claim 44 wherein a current provided by the power supply is maintained substantially in phase with a voltage provided by the power supply.

46. The method in accordance with claim 44 wherein the first means compares a signal representative a voltage across the output capacitor to a signal representative of a current drawn by the power factor correction boost converter for controlling timing for charging and discharging the first inductor.

47. A method of performing power factor correction in a boost converter, the method comprising steps of:
- a. charging a first inductor with energy from an alternating-current power supply;
- b. discharging the first inductor into an output capacitor;
- c. charging a second inductor with energy from the power supply wherein the step of charging the second inductor is initiated prior to completion of the step of discharging the first inductor;
- d. discharging the second inductor into the output capacitor; and
- e. sensing a voltage across the output capacitor and a combined current drawn from the power supply through the first and second inductors for controlling timing for performing the steps a.–d..

48. The method in accordance with claim 47 wherein the first means compares a signal representative a voltage across the output capacitor to a signal representative of a current drawn by the power factor correction boost converter for controlling timing for charging and discharging the first inductor.

* * * * *